United States Patent [19]
Kern et al.

[11] Patent Number: 5,921,566
[45] Date of Patent: Jul. 13, 1999

[54] DOLLY WITH ONE-PIECE PLASTIC FRAME

[75] Inventors: Alan R. Kern, Richmond; Terrill M. Porter, Glen Allen, both of Va.

[73] Assignee: Rehrig International Inc., Richmond, Va.

[21] Appl. No.: 09/079,403

[22] Filed: May 15, 1998

[51] Int. Cl.[6] .................................................. B62B 1/00
[52] U.S. Cl. .................................. 280/79.11; 280/47.34
[58] Field of Search .............................. 280/79.11, 47.34

[56] References Cited

U.S. PATENT DOCUMENTS

| | | | |
|---|---|---|---|
| 4,060,252 | 11/1977 | Mowery | 280/79.1 R |
| 4,077,644 | 3/1978 | Roby et al. | 280/47.34 |
| 4,103,857 | 8/1978 | Levenhagen | 248/346 |
| 4,720,115 | 1/1988 | Rehrig | 280/79.1 R |
| 4,822,066 | 4/1989 | Rehrig | 280/79.11 |
| 4,824,129 | 4/1989 | Rehrig | 280/79.11 |

FOREIGN PATENT DOCUMENTS

| | | | |
|---|---|---|---|
| 1485314 | 5/1967 | France | 280/79.11 |
| 2426549 | 12/1974 | Germany | 280/79.11 |
| 2207894 | 2/1989 | United Kingdom | 280/79.11 |

*Primary Examiner*—J. J. Swann
*Assistant Examiner*—James S. McClellan
*Attorney, Agent, or Firm*—Bacon & Thomas, PLLC

[57] ABSTRACT

A dolly with a one-step injection molded one-piece plastic frame is provided. The frame includes a pair of substantially parallel longitudinal side members and a pair of substantially parallel transverse side members which form a generally rectangular frame having corners. A bottom of the dolly is at least partially formed in a honeycomb/cellular configuration. A plurality of casters are mounted to the bottom of the frame via a plurality of caster fastening bolts which are received in a corresponding plurality of caster fastening holes disposed at the corners. The dolly may also include a riser block disposed on a top of the frame along a side member and secured to the frame by the caster fastening bolts. A rubber pad may be disposed on the riser block and secured between the riser block and the top of the frame. The dolly may also include a channel in the bottom of one or more side members for receiving a reinforcing member.

2 Claims, 3 Drawing Sheets

DOLLY WITH ONE-PIECE PLASTIC FRAME

BACKGROUND OF THE INVENTION

1. Field Of The Invention

The invention relates to a dolly with a one-piece plastic frame. More specifically, the invention relates to a dolly with a one-step injection molded one-piece plastic frame.

2. Brief Description Of The Related Art

It is well known to provide a plastic dolly with a rectangular frame formed by connecting a plurality of frame members. Such dollies typically include casters which are connected to the frame by caster bolts which are also used to secure the frame members together.

It is also known to include reinforcement elements in the frame members which are then assembled with the frame members to form the frame. It is also known to provide riser pads with protective caps for such a dolly. These riser pads and protective caps are similarly assembled with the frame members to form the frame of the dolly.

These known dollies, however, have the disadvantage that the entire dolly and frame must be disassembled to change its configuration. For instance, if a riser pad or protective cap is damaged and needs to be replaced, bolts must be removed for replacement of the damaged parts and removal of these bolts disassembles at least part of the frame. Also, if a different combination of reinforcement elements and/or riser blocks is required for supporting and transporting a specific load, the frame itself must at least partially be disassembled. This disassembly and reassembly of the frame itself may lead to an undesirable weakening of the structural strength and stability of the dolly.

SUMMARY OF THE INVENTION

The present invention aims towards a plastic dolly which avoids the above-mentioned disadvantages, which is easy to manufacture and provides the advantages of known plastic dollies.

To this end, a dolly with a one-step injection molded one-piece plastic frame is provided. The one-piece plastic frame comprises a pair of substantially parallel longitudinal side members and pair of substantially parallel transverse side members which form a generally rectangular frame having corners.

The dolly of the present invention includes a bottom which may be at least partially formed in a honeycomb/cellular configuration to provide structural strength and stability.

The frame of the present invention includes a plurality of caster fastening holes disposed at the corners thereof. The caster fastening holes are formed to receive a corresponding plurality of caster fastening bolts for connecting a plurality of casters to the bottom of the frame.

The casters may be mounted on a corresponding plurality of caster plates provided with caster plate holes through which the caster fastening bolts connect the caster plates to the bottom of the frame.

A side member of the frame may include a channel in the bottom thereof which receives a reinforcing member. The channel may extend into the corners of the frame such that the reinforcing member is retained in the channel by the casters or the caster plates.

The dolly of the present invention may also include a riser block or blocks which may be disposed on a top of the frame along a side member and secured to the frame at the corners by the caster fastening bolts.

The dolly of the present invention may also include a rubber pad or pads which may be disposed on the riser block or blocks. The rubber pad may include rubber tabs which may be secured between the riser block and the top of the frame.

Various additional features and advantages of the dolly of the present invention will become clear upon a review of the detailed description and accompanying drawings that follow.

BRIEF DESCRIPTION OF THE DRAWINGS

In order to more particularly point out the features of the present invention, the following preferred embodiments are presented, as examples only without any limiting character, with reference to the accompanying drawings, in which.

DETAILED DESCRIPTION OF THE PREFERRED EMBODIMENTS

Figure 1:
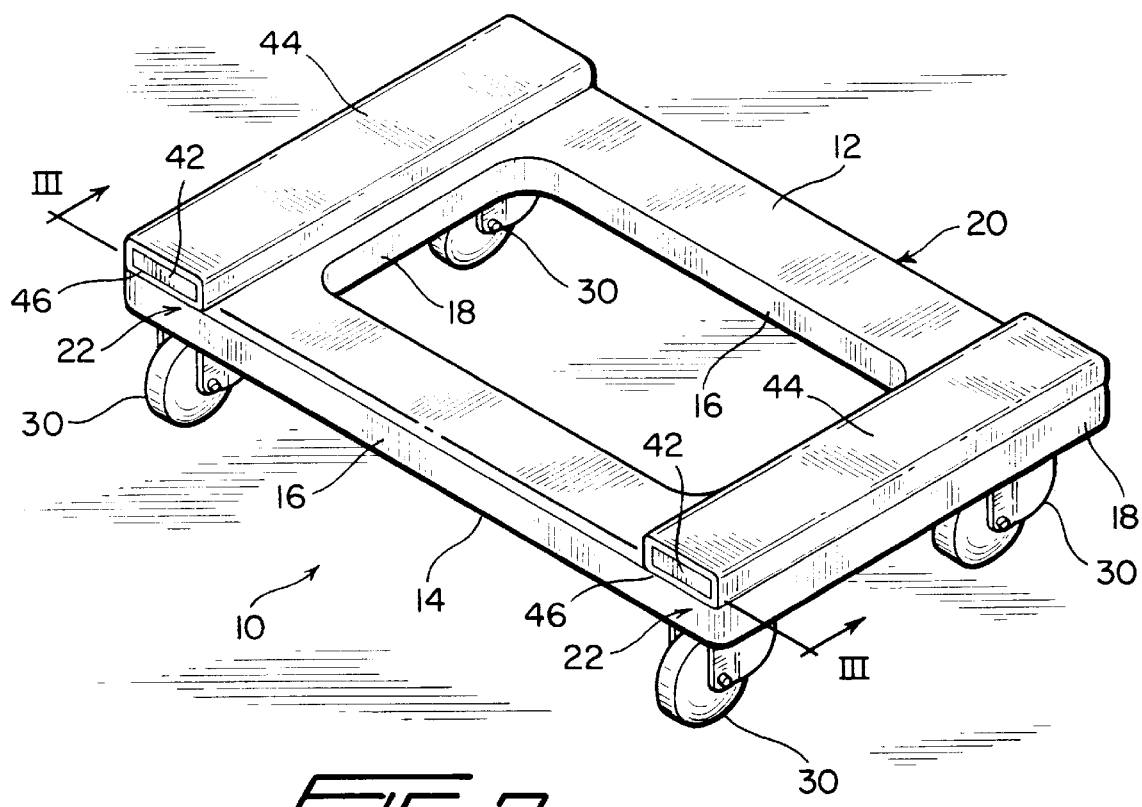
FIG. 1 is an upper perspective view of a dolly according to the invention.

As shown in FIG. 1, a plastic dolly 10 having a top 12 and a bottom 14 comprises a pair of substantially parallel longitudinal side members 16 and a pair of substantially parallel transverse side members 18 which form a generally rectangular frame 20 having corners 22. Dolly 10 is injection molded in a single step. Therefore, longitudinal side members 16 and transverse side members 18 are integrally formed to obtain frame 20. One-step injection molding of a one-piece frame requires only single mold and does not require assembly of individual frame pieces.

Figure 2:
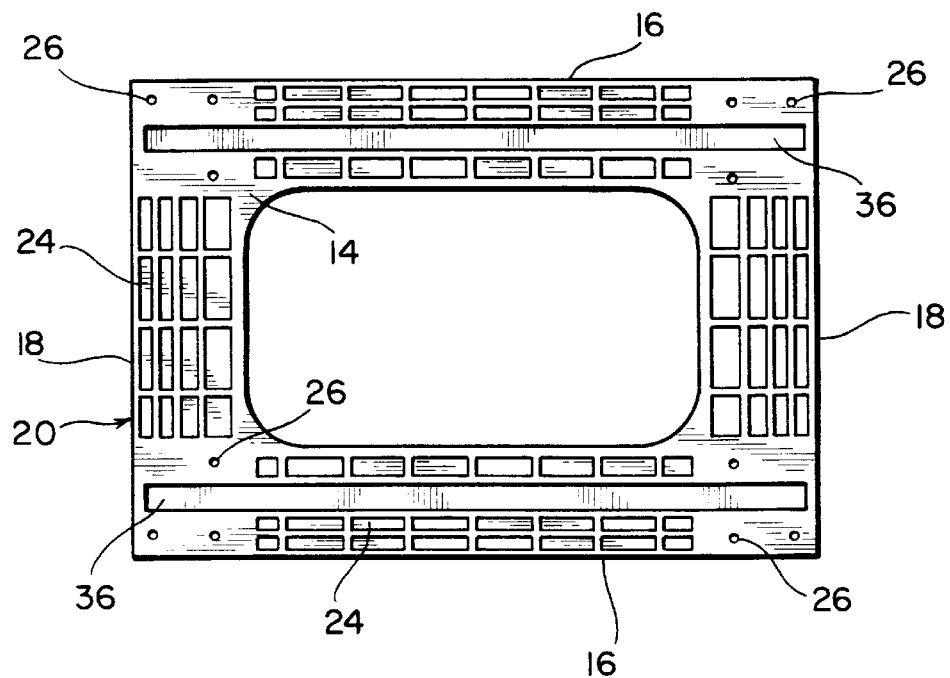
FIG. 2 is a bottom view of a frame of a dolly according to the invention.
Figure 3:
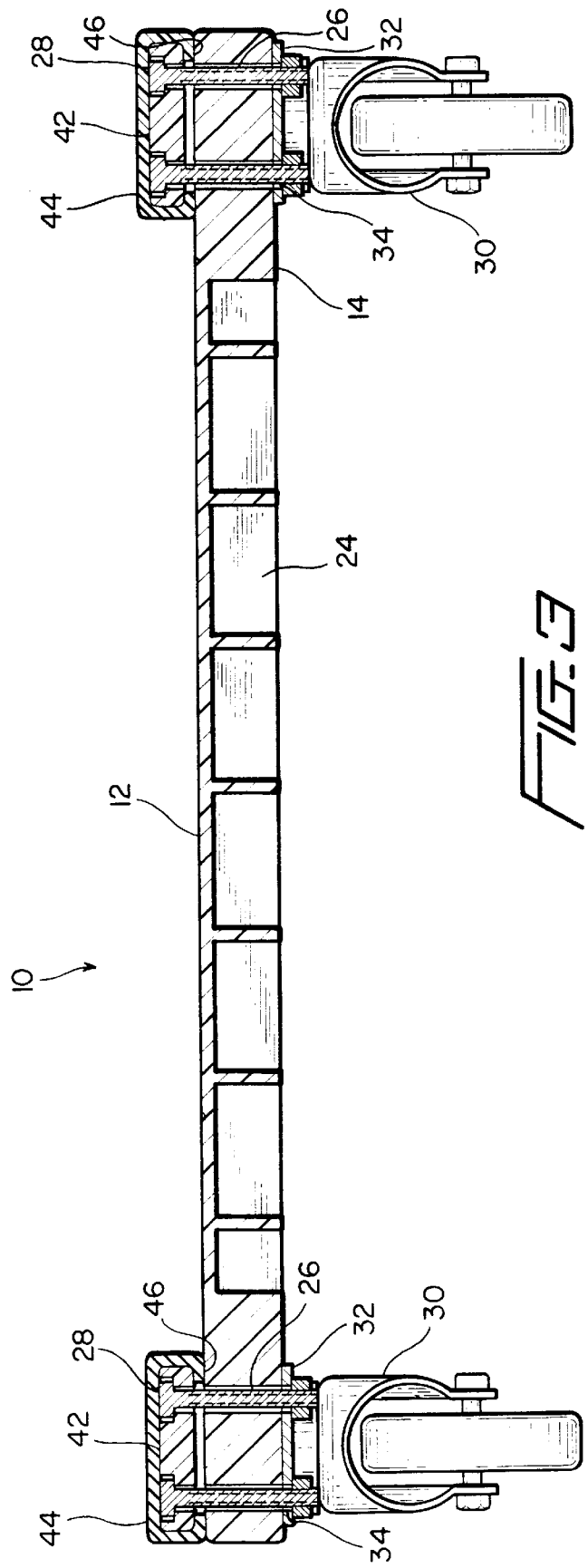
FIG. 3 is a side sectional view taken along the section line III—III shown in FIG. 1.

As represented in FIG. 2, bottom 14 is at least partially formed in a honeycomb/cellular configuration 24 to provide additional structural strength and stability while reducing the material required and overall weight of the dolly. Honeycomb/cellular configuration 24 may or may not extend into corners 22, but at least extends along side members 16 and 18 between corners 22.

A plurality of caster fastening holes 26 is formed in each corner 22. Caster fastening holes 26 receive a corresponding plurality of caster fastening bolts 28 for securing a plurality of casters 30 to bottom 14 of frame 20 at corners 22. Casters 30 may be secured to bottom 14 on a corresponding plurality of caster plates 32 by caster fastening bolts 28 extending through a corresponding plurality of caster plate holes 34.

Preferably, exactly three caster fastening holes 26 and three caster fastening bolts 28 are used at each corner 22. As shown in the figures, an "L" arrangement of caster fastening holes 26 at each corner 22 is preferred. Using exactly three caster fastening holes 26 in each corner 22 provides sufficient connecting strength while minimizing the number of caster fastening holes 26 which must be formed in frame 20 and the number of caster fastening bolts 28 which must be used.

As mentioned above, honeycomb/cellular configuration 24 may or may not extend into corners 22. Preferably it does not so that corners 22 of frame 20 are solid and thus provide strength to caster fastening holes 26 and stability to caster fastening bolts 28 disposed therein. If honeycomb/cellular configuration 24 does extend into corners 22, reinforcing plastic would be necessary at caster fastening holes 26 to provide similar strength and stability.

In a preferred embodiment, longitudinal side members 16 each include a longitudinal channel 36 in bottom 14 thereof. Longitudinal channels 36 are each formed to receive a reinforcing member 38 which thereby extends in the respective longitudinal channel 36 along the respective longitudinal side member 16. Preferably, reinforcing members 38 comprise one-inch diameter steel tubes. It is not excluded, however, to use other materials, dimensions or shapes for reinforcing members 38. It is also not excluded to form channels 36, for receiving reinforcing members 38, along transverse side members 18 instead of, or in addition to, forming channels 26 along longitudinal side members 16.

Channels 36 and reinforcing members 38 preferably extend into corners 22. Thus, reinforcing members 38 may be retained in channels 36 by caster 30, or caster plates 32, at corners 22.

A preferred embodiment, as represented in FIG. 1, includes a riser block 42 disposed on top 12 of dolly 10 along transverse side members 18. It is not excluded, of course, to locate riser blocks 42 along longitudinal side members 16 instead of, or in addition to, along transverse side members 18. It is also contemplated by the present invention that multiple riser blocks 42 may be used in combination to achieve a desired height.

As also represented in FIG. 1, a preferred embodiment includes rubber pads 44 which fit over individual riser blocks 42. Rubber pads 44 provide a padded gripping surface for transporting an object on dolly 10 which itself may be relatively hard and provide relatively little friction.

Rubber pads 44 include rubber tabs 46 which are used to secure rubber pads 44 over riser blocks 42. Rubber tabs 46 are held or clamped between riser blocks 42 and top 12 of dolly 10. Caster fastening bolts 28 securing riser blocks 42 and casters 30 to frame 20 provide the clamping force. If multiple riser blocks 42 are stacked or used in combination, the specific dimensions of rubber pads 44 must be adjusted for rubber tabs 46 to be clamped between riser blocks 42 and top 12 of dolly 10.

Figure 4:
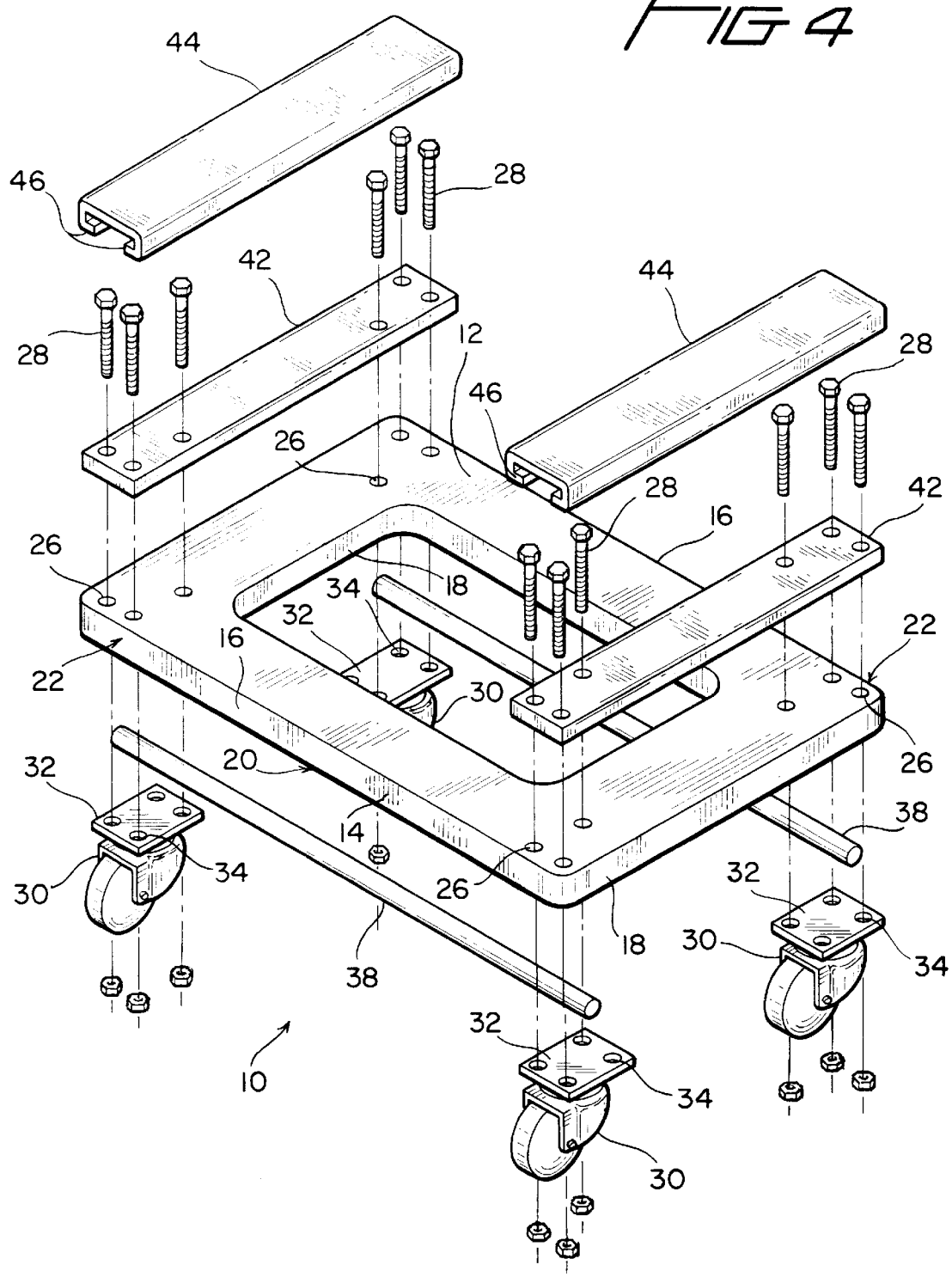
FIG. 4 is an expanded perspective view of a dolly according to the invention.

As represented in FIG. 4, the assembly of dolly 10 is simple and only involves securing casters 30, and possibly caster plates 32, reinforcing members 38, optional riser blocks 42 and optional rubber pads 44, to frame 20 using three caster fastening bolts 28. Therefore, dolly 10 itself will not be structurally weakened by disassembly and reassembly to obtain different combinations of reinforcing members 38, riser blocks 42 and rubber pads 44. Frame 20 always maintains its integrity and structurally is not subject to wear from disassembly and reassembly.

The present invention of a one-piece dolly is in no way limited to the preferred embodiments described above and represented in the drawings; on the contrary, various modifications may be made to such a one-piece dolly while remaining within the scope of the invention, which is defined in the claims below.

We claim:

1. A dolly with a one-piece plastic frame, said dolly comprising:

a one-step injection molded one-piece generally rectangular plastic frame having a top and a bottom, said frame defining a pair of longitudinal side members and a pair of transverse side members, said longitudinal and transverse side members intersecting at frame corners; and a plurality of caster fastening holes formed in each of said corners for receiving a corresponding plurality of caster fastening bolts which secure a plurality of casters having corresponding holes to said bottom of said frame at said corner;

a plastic riser block disposed on top of said frame at one of said transverse side members, said caster fastening holes continuing through said riser block; and a plurality of caster fastening bolts corresponding to and extending through said caster fastening holes such that said riser block is connected to said top of said frame by said caster fastening bolts;

wherein said bottom of said frame is at least partially formed in a honeycomb/cellular configuration only along said transverse and longitudinal side members between said corners where said casters are to be secured.

2. A dolly according to claim 1, further comprising:

a rubber pad with rubber tabs, wherein said riser block has two entirely flat bottom edges on opposite sides thereof, said rubber pad fitting over said riser block and being secured by said rubber tabs being retained between the entirely flat bottom edges of said riser block and said top of said frame under a clamping force exerted on said riser block and said frame by said caster fastening bolts.

* * * * *